(12) United States Patent
Rajaram et al.

(10) Patent No.: US 11,550,809 B2
(45) Date of Patent: Jan. 10, 2023

(54) FINITE STATE AUTOMATA THAT ENABLES CONTINUOUS DELIVERY OF MACHINE LEARNING MODELS

(71) Applicant: FINEOS Corporation, Inc., Dublin (IE)

(72) Inventors: Santoash Rajaram, Alameda, CA (US); Karan Mishra, Chicago, IL (US); Matthew O'Mara, Ardmore, PA (US)

(73) Assignee: FINEOS Corporation, Inc., Dublin (IE)

( * ) Notice: Subject to any disclaimer, the term of this patent is extended or adjusted under 35 U.S.C. 154(b) by 863 days.

(21) Appl. No.: 16/229,020

(22) Filed: Dec. 21, 2018

(65) Prior Publication Data

US 2020/0110619 A1    Apr. 9, 2020

Related U.S. Application Data

(60) Provisional application No. 62/742,160, filed on Oct. 5, 2018.

(51) Int. Cl.
| | | |
|---|---|---|
| *G06F 9/448* | (2018.01) | |
| *G06F 16/904* | (2019.01) | |
| *G06N 20/00* | (2019.01) | |
| *G06K 9/62* | (2022.01) | |
| *G06F 16/25* | (2019.01) | |
| *G06F 16/17* | (2019.01) | |

(52) U.S. Cl.
CPC .......... *G06F 16/254* (2019.01); *G06N 20/00* (2019.01)

(58) Field of Classification Search
CPC .. G06F 9/4498; G06F 16/904; G06F 16/1734; G06N 20/00; G06K 9/6262
See application file for complete search history.

(56) References Cited

U.S. PATENT DOCUMENTS

2019/0205791 A1*    7/2019    Litherland ............. G06N 7/005

* cited by examiner

*Primary Examiner* — Jay A Morrison
(74) *Attorney, Agent, or Firm* — Flaster Greenberg, P.C.

(57) ABSTRACT

A finite state automata (FSA) may comprise of a plurality of states and a plurality of events that are triggered to transition between the plurality of states to enable the continuous delivery of one or more machine learning (ML) models. Datasets may be uploaded by one or more users to a computing device. Each dataset may include columns of attributes and/or rows of data for each attribute. Each dataset may be analyzed according to respective predefined ML model criteria. Each dataset may be automatically transformed and/or enhanced to meet the predefined ML model criteria. Data analysis may be performed on each dataset to inform the building of the ML models. An algorithm may be received for each ML model. Each ML model may be built based on the respective dataset and the respective algorithm to generate an ML model file. Logs may be stored for tracking the process performed by the FSA.

20 Claims, 6 Drawing Sheets

FINITE STATE AUTOMATA THAT ENABLES CONTINUOUS DELIVERY OF MACHINE LEARNING MODELS

CROSS-REFERENCE TO RELATED APPLICATIONS

This application claims the benefit of U.S. Provisional Patent Application No. 62/742,160, filed Oct. 5, 2018, the entire disclosure of which is incorporated by reference herein.

BACKGROUND

Machine-learning has been used to generate predictive models from datasets. Many current machine-learning infrastructures use an open platform that allows a data administrator to build the predictive models from the dataset by selecting code based on the types of information in a given dataset. Once the model is built, the model may be deployed into a production environment, such as by deploying the results of the model for automating decision making by a business unit. Once in production, the model may be maintained in response to changes in the data.

Present machine-learning infrastructures fail to appropriately allow for continuous delivery of a machine learning model to support self-learning from data ingestion through model deployment. Users, such as data scientists, have an open platform with little structure or documentation during the process of building, training, and/or deploying of the ML model. As there is little structure to the open platforms, users also fail to have consistency in the output of the process of building, training, and/or deploying an ML model. The process of building and maintaining an ML model may include multiple users working with multiple datasets and/or ML models, or versions of models, at the same time. As a result, ML applications, particularly in industries with legacy data challenges or multiple data source challenges, may be hard to build and maintain in an open platform.

SUMMARY

Example systems, methods, and apparatus may implement a finite state automata (FSA) that enables the continuous delivery of one or more machine learning (ML) models, which may start with data ingestion through delivery of the model to a pre-defined format. The FSA may comprise a plurality of states and a plurality of events that are triggered to transition between the plurality of states. The FSA may provide a structured process for multiple ML models to be built, trained, and/or deployed with consistency. The FSA may allow for observability of datasets and/or analysis on the datasets. The FSA may allow for observability of the steps involved in the process. The FSA may allow for repeatability in terms of the steps performed for the same or different datasets, as well as the input and/or output for achieving a successful ML model. As the process progresses, the FSA may control the next step in the process that is implemented. As such, the FSA may allow for continuous delivery infrastructure for ML models.

The FSA may track two objects, such as the datasets and the models. One or more datasets may be uploaded to a computing device. Each dataset may comprise a plurality of columns of attributes and/or a plurality of rows of data for each attribute. The FSA may assign a unique identifier to each uploaded dataset and may treat each dataset as an immutable object. One or more ML models may be uploaded to a computing device. Models may comprise of a model file and metadata about the model such as name, algorithm used, parameters, etc. The FSA may assign a unique identifier to each model file that is uploaded. The FSA may treat each model as an immutable object. Each dataset may include results of analysis run by the users. The analysis results may be captured as graphs and/or tabular structures along with a dataset. Datasets may be immutable and the analysis results stay true for the lifetime of the datasets. The FSA may be agnostic to the source of data ingestion.

Transformation events may support capturing a source dataset, a destination dataset, and/or the name of the transformation. Each dataset may be automatically transformed to meet the predefined ML model criteria. The transformation of each dataset may include changing the columns of attributes or the rows of data for the dataset. For example, the format or data type for the attributes and/or data may be transformed. Each transformation may produce a different dataset.

Data enrichment events may support combining multiple datasets. Each dataset may be enhanced by combining other datasets to it or by deriving additional attributes based on the existing data. The enhancement of each dataset may include adding at least one column of attributes to the plurality of columns of attributes for the dataset to increase the accuracy to the ML models.

Data analysis events may be performed on each dataset to inform the building of the ML models and/or debug model building processes in production. The data analysis events may be triggered automatically after transformation and/or enhancement of the dataset. The data analysis events may be triggered in response to user input. The data analysis events may include a data visualization event that generates a graph of the data in one or more of the columns of attributes in the dataset. The data analysis events may include a record statistics event that calculates and stores characteristics of each column attribute comprising numerical values. The characteristics of each column attribute comprising numerical values may include an average, a minimum, a maximum, a mean, a median, a standard deviation, or a total count value for the attribute. The data analysis events may include a feature extraction event that identifies features of the attributes in the dataset. The features of the attributes in the dataset may include a number of attributes in the dataset, a value type for each attribute, whether the attribute includes blank values, whether the attribute requires a valid fill, whether the attribute includes continuous variables, or whether the attribute includes predefined categorical values.

A data test event may capture results of the tests that were run on dataset and data analysis results for each dataset to meet a respective rule set established for the ML model. The rule set may include at least one threshold that is tested for a numerical value associated with an attribute of the dataset. The data test event may be used to test the assumptions made related to the data.

A model building event may capture the dataset, the algorithm, and the model parameters used to generate an ML model file. The performance of the ML models may be evaluated. A score may be determined that is associated with each of ML models. The score may be compared to a threshold to determine whether the ML model is performing below a threshold. If the score is below the threshold, the FSA may terminate the flow and an alert may be displayed to a user that the at least one of the plurality of ML models failed the evaluation.

Log events may be stored for tracking the process performed at each step. Log events may not alter the state of the FSA. A log may be stored that includes each transformation that was performed on the datasets to meet the predefined ML model criteria. A log may be stored that includes each enhancement that was performed on the datasets to meet the predefined ML model criteria. A log may be stored that includes each type of data analysis that was performed on the datasets. The logs may be accessed by the user to better understand the process and/or problems with the dataset or the ML model.

The FSA may store datasets as their own entities in a database. Some of the metadata about the datasets may include name, location of the file, user who created the file, and/or the time at which the dataset was created. The FSA may store each of the other datasets related to the given dataset. The FSA may store the relationships as "edges" (in reference to a direct analytic graph (DAG)). The edges may have a fromDataSet and toDataset and the name of the transformation that created this edge. Since datasets are immutable, each transformation may create an additional dataset and an edge.

DETAILED DESCRIPTION

Figure 1:
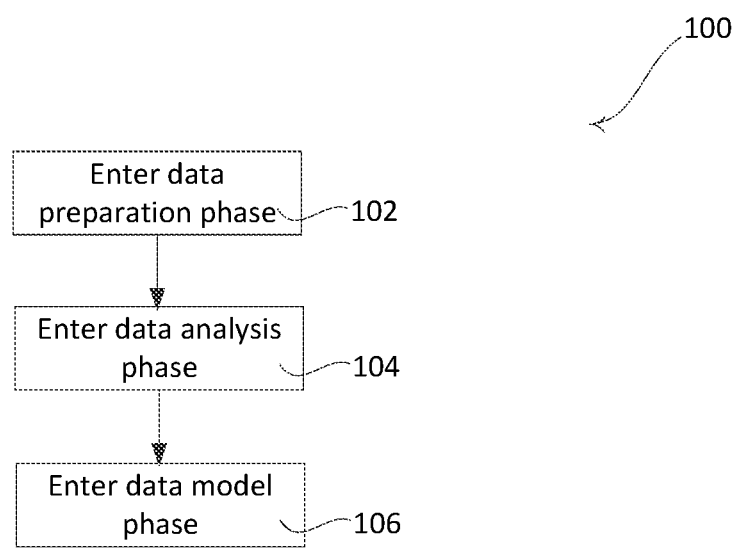
FIG. 1 is a flow diagram illustrating an example process for a finite state automata (FSA).

A machine-learning (ML) model may be built to identify or predict a target attribute based on other attributes in a dataset. The FSA may be used to control the sequence of steps through which the model building process progresses.

The ML model building process may be built to receive a dataset in a certain format. For example, the dataset may be received as a database with rows of data entries and columns that indicate the attributes for each row in the dataset. The incoming data may be transformed and filtered to better fit the structure the model algorithm expects. The predefined input format may include a predefined file type, a predefined number of columns, mandatory columns (e.g., mandatory attributes), optional columns (e.g., optional attributes), a predefined format for each entry in a column, etc. The model building process may be built to receive these attributes in the predefined input format. The FSA may receive events from the process with information about datasets and their transformations to update the state.

The datasets may be enhanced by including some additional data. For example, the user may configure to combine the client dataset with a financial dataset based on a key column in the two datasets. After enrichment, the FSA may receive an enrichment event that takes the datasets that were combined together. The data that may be sent as parameters to retrieve the data from the external data source may be predefined. For example, the financial data may be retrieved from the identified external data source by sending a request that includes the name and social security number of a person in a given record.

The FSA may receive a data test event with results of tests before proceeding to data analysis and model building phases. The data test event may include tests that checks the correlation between attributes, frequency of an attribute value, number of rows available, etc. The FSA may expect data test events with information about the tests to proceed to the next state. Data test events may be implemented to progress between phases. The FSA may abort if the model process does not send a data test event. Some of the tests may include correlations between data for attributes in the dataset (e.g., values for attribute A directly correlate to values for attribute B in the dataset, such as the gender attribute having a predefined correlation to a maternity claim, an age attribute having predefined correlation to a valid policy holder, etc.), format of data available for certain attributes (e.g., format of date fields, confirmation of numeric values being captured as such, etc.), an amount of data available for each attribute in the columns (e.g. missing rows of data), and/or an amount of historical data available to build (e.g., total dataset available including predefined number of row entries and/or attributes).

The datasets, that are received as input into the ML model building phase of the FSA, may include training data that may be used to train the ML model. The training dataset may include a known result for the target attribute, from which the ML model may learn to identify correlations between the known result of the target attribute and the other attributes in the dataset. During the training of the ML model, the ML model may identify the correlations between the target attribute and other attributes in the training data. The correlations may be identified based on predefined assumptions that are defined as parameters within the ML model. The accuracy of the model may be tested, and a score may be generated that indicates the accuracy of the predictions generated by the ML model. At the end of the model building phase, FSA may expect one or more events. One type of event may be an event to store the model details and create a unique model identifier. Another type of event may be model evaluation events to store the performance of the generated model and measure against required thresholds.

After the model is built, the model may be put into production to predict results for the target attribute on additional datasets. When the ML model is in production, any additional or updated dataset ingested may go through the same model building process conducted by the FSA the first time. Hence, the model may be maintained as the datasets being input into the ML model change. Each iteration of this process may produce another version of the ML model. The accuracy of the ML model may change as the data in the datasets change. The FSA may facilitate delivering additional or updated models to production as long as the data tests pass and model evaluation meets the threshold. If the accuracy of the ML model is outside of a predefined threshold, the ML model may be updated to compensate for the changes in the data.

A state machine may be implemented to guide a user, such as a data administrator, through a standard automated process for preparation of a dataset for delivery and deployment of the ML model. The process may enable continuous delivery for the ML model and creation of a repeatable and reliable process for improving the ML model in response to changes in data. The state machine may also allow for monitoring and/or maintaining ML model after deployment.

The state machine may be a finite state automata (FSA) that may be implemented on one or more computing devices. An FSA may be a mathematical model that may be in one of a finite number of states. The FSA may change from one state to another in response to external inputs or events. The FSA may be defined by an initial state and the events for transitioning to other states. The combination of a prior state and an event may transition the FSA to another state. The states and events for preparation of the dataset and deployment of the ML model may be described in greater detail herein.

The implementation of an FSA by a computing device for preparing datasets and deploying ML models may provide a structured template that automatically captures the appropriate information for the predefined model criteria of multiple ML models, deploys the ML models, tracks changes in the datasets, and provide feedback to the user regarding the ML model. The user may upload a dataset to a computing device and the FSA may automatically transform and/or enrich the dataset to prepare the dataset according to the predefined model criteria. The prepared dataset may be analyzed, and the model may be automatically deployed as described herein.

FIG. 1 is a flow diagram that illustrates an example process 100 that may be implemented by one or more computing devices for enabling continuous delivery of an ML model. The process 100 may be implemented by a single computing device or distributed across multiple computing devices.

As shown in FIG. 1, the process 100 for may be part of an FSA that may enable the continuous delivery of ML models. The process 100 may be an automated process that may be performed upon receipt of an initial dataset. An initial dataset may be uploaded by a user via a user interface (e.g., from a remote or local storage). For example, the initial dataset may be uploaded to a local application running on a computing device, or via a local application (e.g., web browser) to a remote computing device.

After the initial dataset is uploaded, the process 100 may begin by entering a data preparation phase at 102. The data preparation phase may convert the initial dataset into the defined input format expected by the model algorithm. For example, the data preparation phase may be implemented to transform and/or enrich the initial dataset, thereby producing a final dataset that conforms to the expectations of the model algorithm. Data transformation may include changing how portions of the initial dataset are represented to conform to the expectations of the model algorithm. Different algorithms and/or models may have different expectations.

The dataset schema and format may be different for each ML model. During the data preparation phase, users may use transformations and enrichments to conform to the expectations of the ML model algorithm. The data transformation may include converting the format of the uploaded file type to the file type of the predefined input format, changing column names (e.g., attribute names), changing information in rows of data (e.g., format of a name, business, etc.), and/or making other changes to the attributes and/or data uploaded in the initial dataset. The changes may be based on identified problems with the attributes or data (e.g., format, terms being used, etc.). The changes may be predefined changes to fix the identified problems (e.g., resulting format, different terms, etc.). The data enrichment may include adding attributes or data to the initial dataset that was unrepresented. For example, additional rows (e.g., data) and/or columns (e.g., attributes) may be added to the initial dataset. The added columns may be columns that improve the performance of a given model. The added data (e.g., row entries) may include null values, predefined values, and/or data entered from additional sources. For example, the added data may include data from an external data sources, such as data that is open to the public or third-party sources, financial data left out of the initial dataset, etc. Predefined assumptions or correlations between attributes may be added during the data enrichment.

The data preparation phase may include data preparation states and/or data preparation events that store the results of the transformations and enrichments. The data preparation states may be specific to the predefined model criteria for a given machine learning model. For example, the data preparation states may cause the transformation and/or enrichment of the initial dataset in a manner specific to the predefined model criteria for the given ML model. The output of the data preparation phase may be a pre-processed dataset that may be specific to the predefined model criteria for the development of the ML model.

At 104, a data analysis phase may be entered. During the data analysis phase, the pre-processed dataset may be taken as input and analysis may be performed for development of the ML model. The types of analysis performed may be different for different datasets and/or ML models. The data analysis phase may include states and/or events that capture different ways to analyze the prepared dataset. The data analysis phase may assist with visualizing the dataset using graphs and/or analyzing using statistical measures. The data analysis phase may be used to assess the behavior of a given dataset. The results of the data analysis phase may be used to verify if the model building process should continue for given dataset. Users may include data tests in this phase to verify if the data meets each the assumptions made during the model development.

A data test may act as a gateway between data preparation and data analysis phase, as well as data analysis and model phase. The FSA may progress to the next phase if the data test passes. The data test may test the pre-processed dataset and notify the user when errors are detected in the pre-processed dataset. The data test may test predefined assumptions made by the users about the dataset and notify the user when the predefined assumptions fail to hold true. Some of the predefined assumptions may include correlations between attributes in the dataset (e.g., values for attribute A directly correlate to values for attribute B in the dataset, such as the gender attribute having a predefined correlation to a maternity claim, an age attribute having predefined correlation to a valid policy holder, etc.), format of data available for certain attributes (e.g., format of date fields, confirmation of numeric values being captured as such, etc.), an amount of data available for each attribute in the columns (e.g. missing rows of data), an amount of historical data available to build (e.g., total dataset available including predefined number of row entries and/or attributes), etc. If the data test fails, the reason for the failure may be logged and the user may be notified so that the dataset may be updated appropriately and uploaded again.

As with continuous delivery of any software, to make continuous delivery successful for an ML model, each ML model may be tested to test the assumptions about the data, pre-processing of the data, and/or performance of the model. The codification of these assumptions ensures that the integrity of the continuous delivery is maintained. If any of the assumptions fail, appropriate flags may be triggered, and the execution of the FSA may be halted for appropriate exception or error handling.

At 106, a data model phase may be entered. The data model phase may include states and/or events that captures the generation of the ML model. The FSA may receive the model generated and evaluation results associated with the generated model. The model building process may take the prepared dataset as input with one or more analysis events and may build the model based on the algorithm specified by the user.

The data analysis phase and/or model phase may include steps that result in the ML model. The example process 100 for the FSA described herein may allow for seamless transition across these states and handling of errors and exceptions that, once resolved, may result in the deployment of the ML model. The ML models, individual versions, and associated performance metrics may be tracked and stored.

Figure 2A:
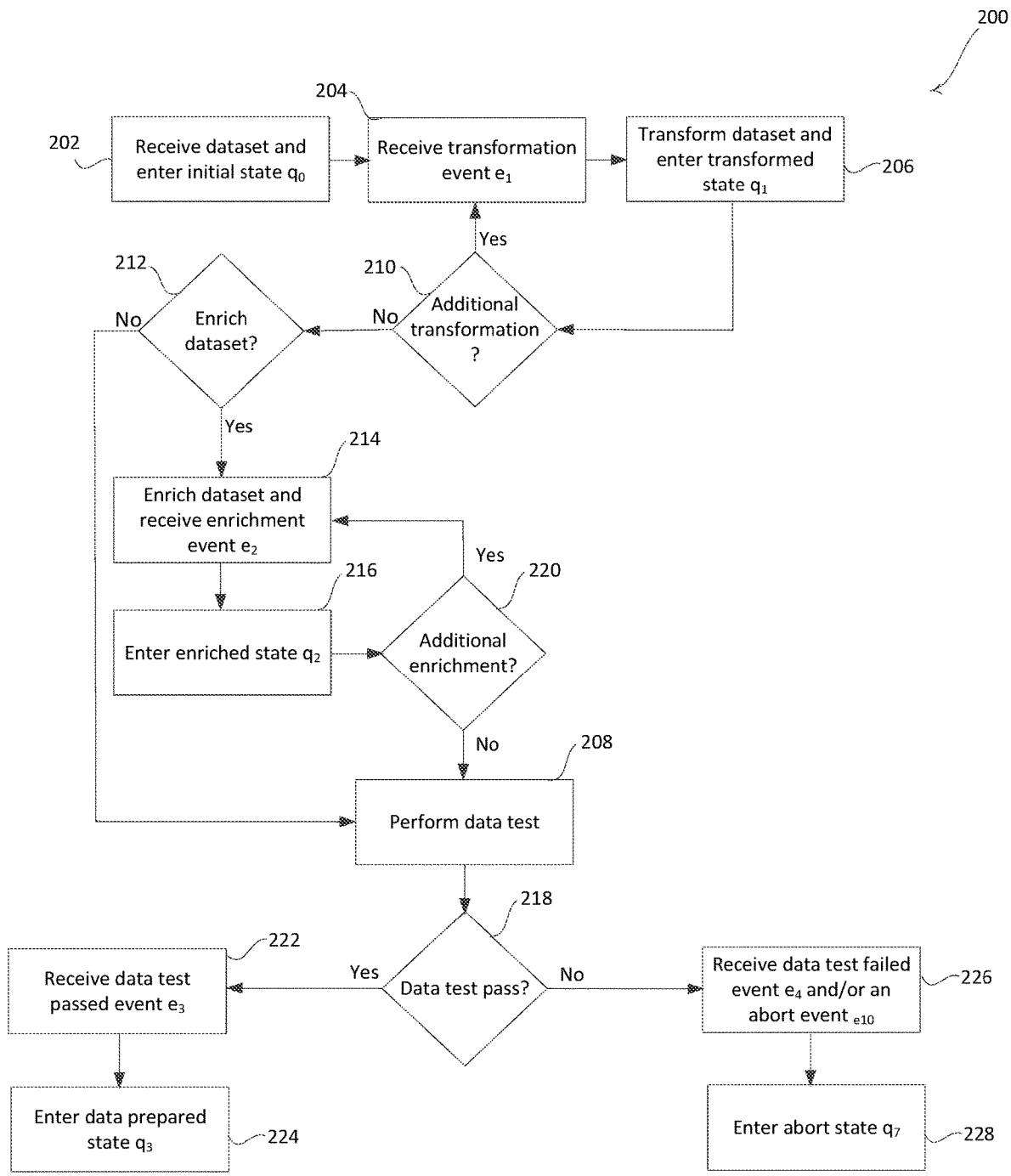
FIG. 2A is an example process that may be performed by an FSA during the data preparation phase.

FIG. 2A is an example process 200 that may be performed by one or more computing devices implementing the data preparation phase of the FSA. The data preparation phase may include a number of data preparation states that may be triggered by one or more data preparation events.

As shown in FIG. 2A, an initial dataset may be received, at 202, and the FSA may be set to an initial state $q_0$. When the FSA is in the initial state $q_0$, the FSA may be initialized. Additional transformation may be performed on the initial dataset to prepare the initial dataset for building the ML model. For example, the initial dataset received from the client may be transformed to update attributes and/or data in the initial dataset to produce another dataset that conforms to the predefined model criteria. Transformations may be applied to existing data and/or attributes of the dataset to fit specific statistical model expectations (e.g., transformation of continuous variables to categorical variables). Enrichment of the dataset may be performed (e.g., based on external data sources identified in the predefined model criteria) to supplement the initial dataset.

At 204, a transformation event $e_1$ may be triggered. The transformation event $e_1$ may be triggered at the end of receipt of a source dataset and/or a transformation of a dataset. The FSA may receive many transformation events $e_1$ during the data preparation phase. During transformation, users may add multiple transformations to the process to create another dataset that is used to produce an ML model. The transformation may include changing the format, names, spelling, etc. of the attributes and/or data in the initial dataset to conform to the defined characteristics in the predefined model criteria. Each transformation event $e_1$ may be triggered to transform one aspect of the dataset. The FSA may create another dataset for each transformation, since the datasets are immutable. Before executing the actual transformation, the transformation step may inquire with the FSA if an edge with a step name already exists for a given dataset. If it exists, then the transformation step may be skipped. If the edge does not exist, then the FSA may receive a transformation event, which in turn may create another dataset and an edge with the same name as the step.

After the transformation event $e_1$ is triggered, at 204, the initial dataset may be transformed to a transformed dataset and the FSA may enter the transformed state $q_1$ at 206. The transformed dataset may represent the result of a transformation of the initial dataset to produce a different dataset. The attributes (e.g., columns) themselves may be transformed, and/or the data corresponding to a given attribute. For example, the format of a row entry for a given column may be updated (e.g., names, dates, dollar amounts, etc. may be changed to a specific format). The transformation may cause generation of additional columns in the dataset to change the way in which a prior dataset may represent the same information or to calculate additional attributes from data represented the prior dataset. For example, some of the examples of transformations may include using one-hot-encoding to categorical variables, and/or adding columns to the incoming dataset to capture results of a logic (e.g., a column called "is high net worth individual" can be calculated based on the data available in each row like income, assets, incomes, number of dependents etc.). The one-hot-encoding may be applied to an integer representation of an attribute (e.g., column) to encode a binary variable to replace each unique integer value for the attribute. For example, a color attribute that includes the colors red, green, and blue may be transformed into three binary color attributes that each comprise an integer representation (e.g., 0 or 1) of whether the respective color attribute exists.

The transformed state $q_1$ may indicate that the dataset has been transformed. If the FSA is already in the transformed state $q_1$, then the FSA may remain in the transformed state at 206 until another event is triggered (e.g., a transformation event, an enrichment event, etc.). A determination may be made, at 210, as to whether additional transformation is to be performed. Additional transformation may be performed when attributes and/or data are detected in the dataset that are inconsistent with how the attributes and/or data are defined in the predefined model criteria. A different transformation event $e_1$ may be triggered for each transformation of the dataset that is performed. The FSA may receive another transformation event $e_1$ for each transformation performed by the model building process. These transformations may bring the initial dataset to an expected format of the model-building step. The transformation may end when the attributes and/or data in the dataset conform to the definition for the identified attributes and/or data in the predefined model criteria.

If additional transformation is to be performed, the method 200 may return to 204 and continue to transform the dataset. The FSA may continue to trigger transformation events and transform the dataset in the transformed state $q_1$ until the data and/or attributes in the dataset conform to the format expected by the model building step. Each transformation may be logged and/or provided as an alert to the user to enable tracking of changes in the initial dataset. The transformed dataset may enable conformity of the datasets for a given ML model.

If additional transformation is not to be performed at 210 (e.g., the data and/or attributes in the dataset conform to the definition for the identified attributes and/or data in the predefined model criteria), a determination may be made at 212 as to whether to enrich the dataset. The FSA may receive a different enrichment event for each pair of datasets to be combined. Enrichment may include supplementing or augmenting the dataset with attributes and/or data that failed to previously be represented in the dataset or be able to be calculated from the data in the dataset. For example, the enrichment of a dataset may comprise adding data and/or attributes from external data sources, such as third-party data sources or data sources open to the public. The addition of attributes may be achieved by joining two datasets by using a combination of one or more common attributes between the two datasets. For example, two datasets may have the common attributes "claimnumber," "lastName," "date of birth," and "userId," which may be added. Some additional examples of such enrichment may include adding health information from a healthcare provider's data source, financial information from a financial institution's data source, social media information from a social media data source, and/or claims information from an insurance provider's data source, for example. Information from an external data source may be accessed based on the data for one or more attributes in a given record. For example, a housing information dataset may be joined with claims dataset based on the name and address of a person in a given record.

Similarly, a financial information dataset may be joined based on the name, social security number, and/or banking information associated with a given claim record. Data enrichment may be logged by including in the log a list of datasets that were used to augment the source dataset.

If, at 212, the dataset is not to be enriched, a data test may be performed at 208. The dataset may be unenriched when the attributes and/or attributes expected for the model are already present in the dataset. The dataset may include the attributes and/or data directly from the external sources, or the attributes and/or data may be uploaded by the client in a format that conforms to the data from the external sources. This enrichment process may be agnostic to where the data originated.

If, at 212, the dataset is to be enriched, the dataset may be enriched and an enrichment event $e_2$ may be triggered at 214. The FSA may receive the enrichment event $e_2$ when data and/or attributes expected to build the model are not directly available or derivable from other attributes in the dataset. The FSA may enter the enriched state $q_2$ at 216. If the FSA is already in the enriched state, the FSA may remain in the enriched state. A different enrichment event $e_2$ may be triggered for each enrichment of the dataset that is performed. Different enrichment events $e_2$ may be triggered to bring multiple datasets together to produce a dataset that can be used to train the ML model. The enrichment may end when the attributes and/or data in the dataset conform to the definition for the identified attributes and/or data expected for training the model.

At 220, a determination may be made as to whether to perform additional enrichment. If additional enrichment is to be performed, the method 200 may return to 214. The FSA may receive data enrichment event $e_2$ to enrich one aspect of the dataset. The FSA may be used to check if the input dataset has an "edge" with the same name as the enrichment step's name. If the input dataset has an "edge" with the same name as the enrichment step's name, then the enrichment step may be skipped. If the input dataset does not have an "edge" with the same name as the enrichment step's name, then the FSA may receive an enrichment event $e_2$ to create an additional dataset and edge with enrichment step's name from input dataset to the additional dataset. This logic may make each data enrichment event $e_2$ idempotent.

If additional enrichment is not to be performed, a data test may be performed. A data test may be performed at 208. The data test may be performed at the end of transformations and/or at the completion of enrichment for the dataset. The data test may test the predefined model criteria. For example, the data test may test each assumption that a user makes while building the model. Some of the assumptions tested may include testing for mandatory attributes, more than the threshold of missing values for certain attributes, correlations between data for attributes in the dataset (e.g., values for attribute A directly correlate to values for attribute B in the dataset, such as the gender attribute having a predefined correlation to a maternity claim, an age attribute having predefined correlation to a valid policy holder, etc.), format of data available for certain attributes (e.g., format of date fields, confirmation of numeric values being captured as such, etc.), an amount of data available for each attribute in the columns (e.g. missing rows of data), or an amount of historical data available to build (e.g., total dataset available including predefined number of row entries and/or attributes).

A determination may be made, at 218, as to whether the dataset passed the data test. If the dataset failed the data test, the FSA may receive data test failed event $e_4$ with failed status at 226. The data test failed event $e_4$ may include details about the dataset (e.g. name, creator, location URL, time created, ClientID, etc.) that is being evaluated along with the tests that failed. The tests that failed may indicate the specific predefined model criteria that were unmet by the dataset. For example, if a client file is missing an attribute called "diagnosisCode," a message may be generated to indicate that a mandatory field is missing in the input field. The data test failed event $e_4$ may trigger the FSA to enter a final state.

An abort event $e_{10}$ may be triggered, at 226, if the data test fails. The abort event $e_{10}$ may signify an abrupt end of the FSA. For example, the FSA may enter the abort state $q_7$ at 228 after the abort event $e_{10}$ is triggered at 226. The abort event $e_{10}$ may send the FSA to its final abort state $q_7$. Other events may be restricted or prevented from being accepted after abort event $e_{10}$ is triggered and the FSA enters the abort state $q_7$.

A log message event $e_{11}$ may be triggered when transformation, enrichment, and/or a data test is performed. These log messages may assist a user in debugging the long running data preparation phases. These log messages may include information specific to a given transformation, enrichment, and/or data test. For example, the log message may include the dataset path, the number of records that were affected by a specific transformation or enrichment, the data tests that were passed/failed, etc. Each log message may be associated with a step and the log message may include information to identify the context in which the message was written. For example, in the transformation step, an error log may include the row number where the error happened. While joining two datasets during an enrichment step, the log message may include the added rows that were ignored because of the missing keys in one of the datasets. The log message may be a warning, information, etc. logged during FSA execution to log the process 200 for the FSA. The FSA may remain in the same state during a log message event $e_{11}$. The log message event $e_{11}$ may be triggered when the FSA is accepting additional events.

If the dataset passed the data test, a data test passed event $e_3$ may be triggered at 222. No further transformation may occur after the dataset passes the data test. The FSA may enter a data prepared state $q_3$ at 224. The data prepared state $q_3$ may represent a success of transformation, enrichment, and/or data tests. The data tests may codify assumptions that may be made by users about the quality and/or condition of the data. The data prepared state $q_3$ may signify the end of the data preparation phase. The result of the data preparation phase may be a dataset that may be used for building the ML model. The data preparation phase may enforce a strict order of transition between states. For example, the data preparation phase may mandate the transition to be from the initial state $q_0$ to the transformed state $q_1$ to the enriched state $q_2$ to the data prepared state $q_3$.

A log message event $e_{11}$ may be triggered after the data test passed event $e_3$ is received at 222 and/or the data prepared state $q_3$ is entered at 224. Log events in the data preparation phase may include details about the dataset and/or the transformations that are being performed. The log messages may be useful to capture some of the intermediate results of a transformation. Log messages may be accessed by the user to view information about the dataset, transformations, enhancements, tests performed, analysis performed, pass/fail information, and/or reasons for an error in the dataset. The FSA may trigger an abort event $e_{10}$ and/or enter the abort state $q_7$ after triggering the data test passed event $e_3$ at 222 and/or the data prepared state $q_3$ is entered at 224. An abort event may be triggered in case of a failure.

After the dataset has been prepared for the ML model, the dataset may be analyzed. Different types of data analysis may be triggered by different types of data analysis events. For example, the dataset may be visualized in response to a data visualization event $e_5$ being triggered, statistics may be generated and/or recorded for the dataset in response to a record statistics event $e_6$, and/or feature extraction may be performed on the dataset in response to a feature extraction event $e_7$.

Analysis may be performed on a dataset that is received or modified for an initial ML model or an existing model. During analysis, users may execute schema extraction, perform statistical analysis, and/or analyze feature significance.

Figure 2B:
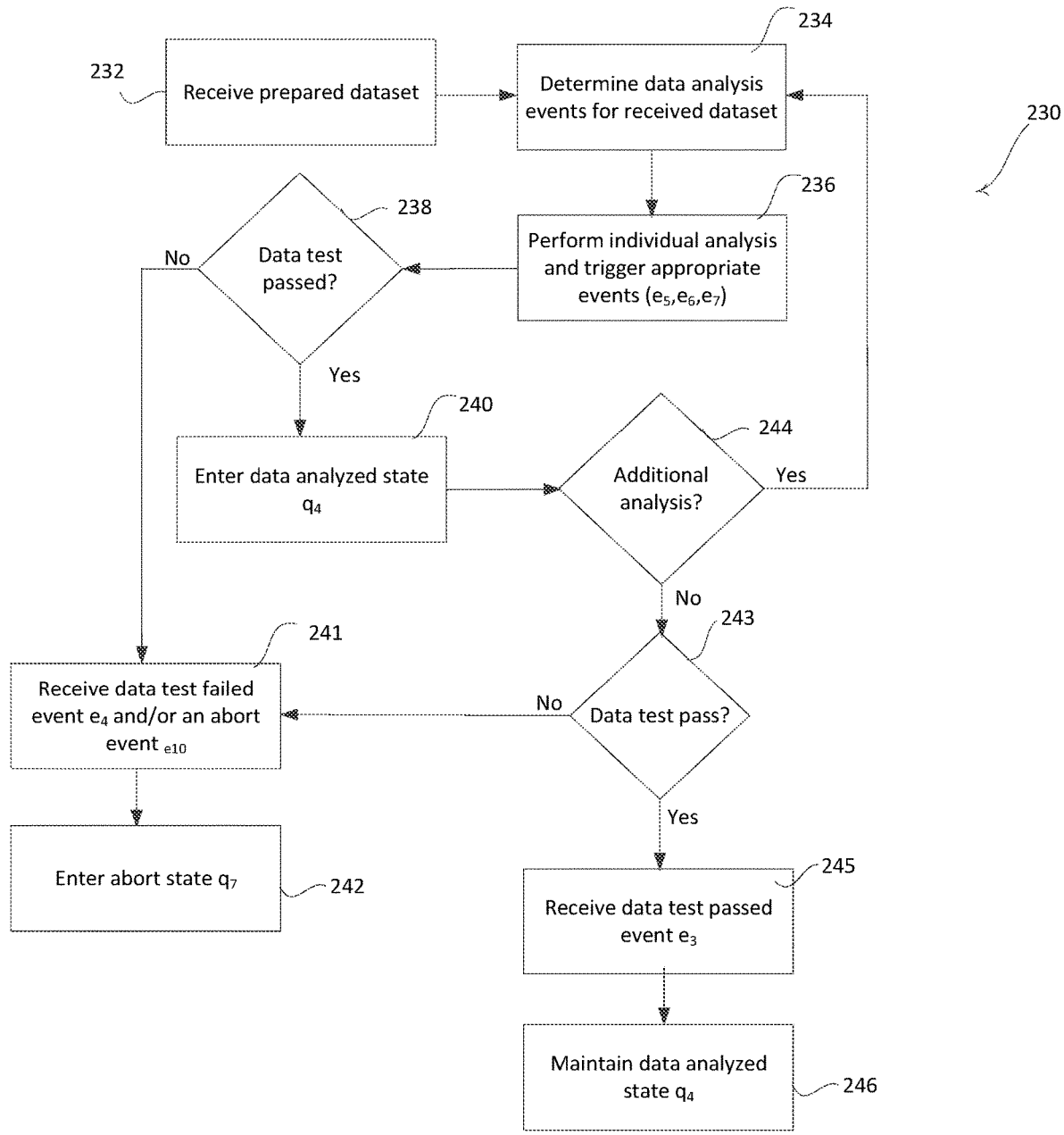
FIG. 2B is an example process that may be performed by an FSA during a data analysis phase.

FIG. 2B is an example process 230 that may be performed by the FSA during the data analysis phase. The data analysis phase may follow the data preparation phase (e.g., the example process 200 that may be performed by the FSA during the data preparation phase shown in FIG. 2A). The data analysis phase may be entered after the data has been prepared and/or a user selection is received at the computing device to enter the data analysis phase. The data analysis phase may include a data analyzed state $q_4$ that may be entered after one or more data analysis events have been triggered.

The FSA may receive the visualization and statistical measures data of the dataset during the data analysis phase. The data analysis phase may take in the prepared dataset and provide options to the user for performing data analysis on the prepared dataset. The user may wish to analyze the dataset differently depending on the data and/or attributes of the dataset, and/or the ML model to be applied to the dataset. There may also be types of analysis that may be useful for multiple types of datasets and/or ML models. As such, data analysis may be performed automatically, and/or the user may be presented with options on a user interface that may allow the user to select types of data analysis to be performed. The types of analysis performed may allow for observability of characteristics of the datasets.

As shown in FIG. 2B, the prepared dataset may be received at 232. A determination may be made, at 234, as to the one or more data analysis events that are to be performed for the received dataset. The data analysis events may include the data visualization event $e_5$, the record statistics event $e_6$, and/or the feature extraction event $e_7$.

The FSA may receive data visualization event $e_5$ after completion of the dataset preparation. The FSA may receive information about the graphs as part of the data visualization event $e_5$. After the dataset is prepared, the user may be presented with predefined types of visualization techniques that may be provided to analyze the dataset to understand the dataset. For example, the data visualization event $e_5$ may be triggered upon a user selection of a button on the interface to generate a scatter plot graph (e.g., showing a correlation between two variables), pair plots (e.g., showing variability and boundary conditions), a histogram (e.g., showing classifications for continuous variables), a bar graph (e.g., showing relative values of different attributes), or another visual representation of the dataset.

Based on the user selection of the type of data visualization, the user may identify the attributes that the user would like to have presented in the visualization. The number of attributes may be predetermined based on the type of visualization selected. The user may select two attributes in the dataset to be displayed in a scatter plot graph. The user may select one attribute in the dataset to be displayed in a histogram. The user may select a number of attributes in the dataset to be displayed in a bar graph. The values in each record in the dataset may be represented in the visualization for each detected attribute. For example, a histogram may represent the number of males to females in a gender attribute. The visualization may provide a graphical representation, and/or the numbers calculated for a given characteristic of the dataset.

The FSA may receive multiple data visualization events $e_5$ during data analysis phase. The FSA may accept different graph types depending on the number of attributes selected. For example, the data visualization event $e_5$ may accept a scatter plot graph when two attributes are selected, a histogram when one or more attributes are selected. The FSA may store the graph information and the state change when it receives the data visualization event $e_5$.

The FSA may receive different graph types in data visualization events $e_5$ for a specific ML model. The data analysis events may be different for different datasets and/or ML models. The data analysis events may be triggered in any order when the FSA is in the data prepared state $q_3$.

The FSA may receive record statistics event $e_6$ for certain attributes. The FSA may receive different kinds of measures for each attribute. For example, the computing device may calculate an average, a minimum, a maximum, a mean, a median, a standard deviation, and/or a total count value for the values in the attribute. The numerical characteristics give a range of characteristics for the attribute. The record statistics event $e_6$ may represent a list of statistical measures that are generated against the dataset. A different event may be generated for each statistic calculated, or a single event may be generated for the group of statistics. Statistical measures may depend on the attribute in consideration.

The FSA may receive feature extraction event e7 during the data analysis phase. This event may include information about different features and information justifying why these features are used. The feature extraction may include information about the features that were selected for the model, the characteristics of those features and their relative significance to the target variable. The feature extraction may indicate to the user the makeup of the data in the dataset. The feature extraction may identify characteristics of the dataset. For example, the feature extraction may identify the number of attributes in the dataset, a value type for each attribute (e.g., string values, integer values, Boolean values, etc.), whether the attribute may include blank values or requires a valid fill, and/or whether the attribute includes continuous variables (e.g., 0, 1, 2, 3, etc.) or predefined categorical values (e.g., male/female for gender category, etc.).

The data visualization event $e_5$, the record statistics event $e_6$, and/or the feature extraction event $e_7$ are allowed to be triggered any number of times during the data analysis phase of the FSA. Since the FSA is an event-based system, optionality may be provided to allow user selections that enable better analysis for different datasets and different ML models. Additionally, since the FSA is an event-based system, duplicate events may be accommodated so that the same event can be triggered multiple times (e.g., in case of a bug in the code or an infrastructure issue (e.g., queue failures)).

The analysis may be performed, at 236, and results of the analysis may be generated. After each analysis is performed, a log event $e_{11}$ may be triggered to generate a log message(s) of the types of data analysis that were performed. During data analysis phase log events may include the details about the dataset that are analyzed, the type of analysis that is performed, the results of the analysis performed, the amount of time taken to perform the analysis, the number of records analyzed, and/or the number of attributes analyzed.

At 238, a data test may be performed, and a determination may be made as to whether the data test was passed. The data test may be performed on the analyzed dataset in order to prepare the dataset for the ML model. For example, a rule set may be established for an ML model and the data test may test the rule set to help to ensure that the same series of steps in a selected algorithm may be run for different datasets that may be uploaded by the user. The rule set that is tested may define assumptions in the dataset that are to be met and/or the statistical measures from the analysis performed. These tests may depend on the statistical measures that were calculated during the data analysis phase. The rule set may be established for one or more attributes of the dataset. For example, the rule set may define thresholds for the numerical values in one or more attributes that are to be met or exceeded. The thresholds may include an upper limit for the maximum values for an attribute in the dataset, a lower limit for the minimum values for an attribute in the dataset, a range for the average value calculated for an attribute in the dataset, a range for the mean value calculated for an attribute in the dataset, a range for the median value calculated for an attribute in the dataset, a range for the standard deviation calculated for an attribute in the dataset, and/or a min/max for the total count value for the records in a dataset.

The rule set may include rules that are predefined and/or rules that are user defined. For example, the user may adjust the threshold values based on the dataset to be uploaded and/or the algorithm to be applied to the ML model. The rule set may be adjusted based on the datasets that are uploaded by the user.

If the data test is passed, the data analyzed state $q_4$ may be entered at 240. The data analyzed state $q_4$ may represent the result of a statistical analysis, data visualization, and/or feature extraction on the dataset. This may be represented as a combination of graphs, statistical measures, and/or key features used by the ML model. The results of the data analysis may be provided to the user for analysis to determine the appropriate algorithm to implement for the ML model and/or identify problems with the dataset or assumptions made on the dataset. The results of the data analysis phase may be captured in a single structure that accumulates the results of each of the data analysis events. Each event in the data analysis phase may represent a result of a type of analysis performed.

If the data test is passed, a log event $e_{11}$ may be triggered that stores a log of the data test and indicates that the data test was passed and/or an indication of the tests that were performed on the dataset. The log event $e_{11}$ being triggered may cause an alert to be provided to the user via a user interface. The alert may indicate that the data test was passed and/or the tests that were performed on the dataset.

If the data test fails at 238, a data test failed event $e_4$ and/or an abort event $e_{10}$ may be received at 241. The FSA may enter the abort state $q_7$ at 242. An abort event may be triggered anytime an unexpected event occurs during data analysis. The unexpected event may include a system failure, an unexpected exception due to a bug in the code, an unexpected data format for an attribute, a value outside of the defined thresholds, an assumption fails to hold true, and/or another exception to the rule set defined for the data test. For example, an assumption may include a standard deviation for an attribute having a certain threshold. An assumption may include a frequency distribution for different values in an attribute being equal.

If the data test fails, a log event $e_{11}$ may be triggered that stores of log of the data test and indicates the failure of the data test and/or the reason for the failure. The log event $e_{11}$ being triggered may cause an alert to be provided to the user via a user interface. The alert may indicate the failure of the data test and/or the reason for the failure. The failure alert may indicate that the user may develop a different ML model for the dataset or something is wrong with the uploaded dataset.

A determination may be made while the FSA is in the data analyzed state $q_4$ as to whether additional analysis is to be performed at 244. The determination may be made based on additional data analysis events (e.g., the data visualization event $e_5$, the record statistics event $e_6$, and/or the feature extraction event $e_7$) being triggered. Each type of analysis may trigger an additional data analysis event. If additional analysis is to be performed, the method 230 may return to 234. If additional analysis is not triggered during the data analyzed state (e.g., each type of analysis has been performed and/or a user indicates that data analysis is complete), the FSA may remain in the data analyzed state at 246 and await another triggering event.

The FSA may provide the result of the analysis events to a data test at 243 (e.g., when analysis has completed). Data tests may be performed to use this data to check if a given statistical measure meets a defined threshold. If the data test failed, the FSA may receive data test failed event $e_4$ with failed status at 241. The data test failed event $e_4$ may include details about the dataset that is being evaluated along with the tests that failed. An abort event $e_{10}$ may be triggered, at 241, if the data test fails. The abort event $e_{10}$ may signify an abrupt end of the FSA. For example, the FSA may enter the abort state $q_7$ at 242 after the abort event $e_{10}$ is triggered at 241. The abort event $e_{10}$ may send the FSA to its final abort state $q_7$. Other events may be restricted or prevented from being accepted after abort event $e_{10}$ is triggered and the FSA enters the abort state $q_7$.

A log message event $e_{11}$ may be triggered when the data test is performed. These log messages may assist a user in debugging the long running data preparation phases. These log messages may include information specific to a given data test. For example, the log message may include the dataset path, the data tests that were passed/failed, etc.

If the data test was passed at 243, a data test passed event $e_3$ may be received at 245. The FSA may maintain the data analyzed state $q_4$ at 246. A log message event $e_{11}$ may be triggered after receiving the data test passed event $e_3$ at 243 and/or the data analyzed state $q_4$ is maintained at 246. Log events in the data analysis phase may include details about the dataset and/or the types of analysis that are being performed.

Figure 2C:
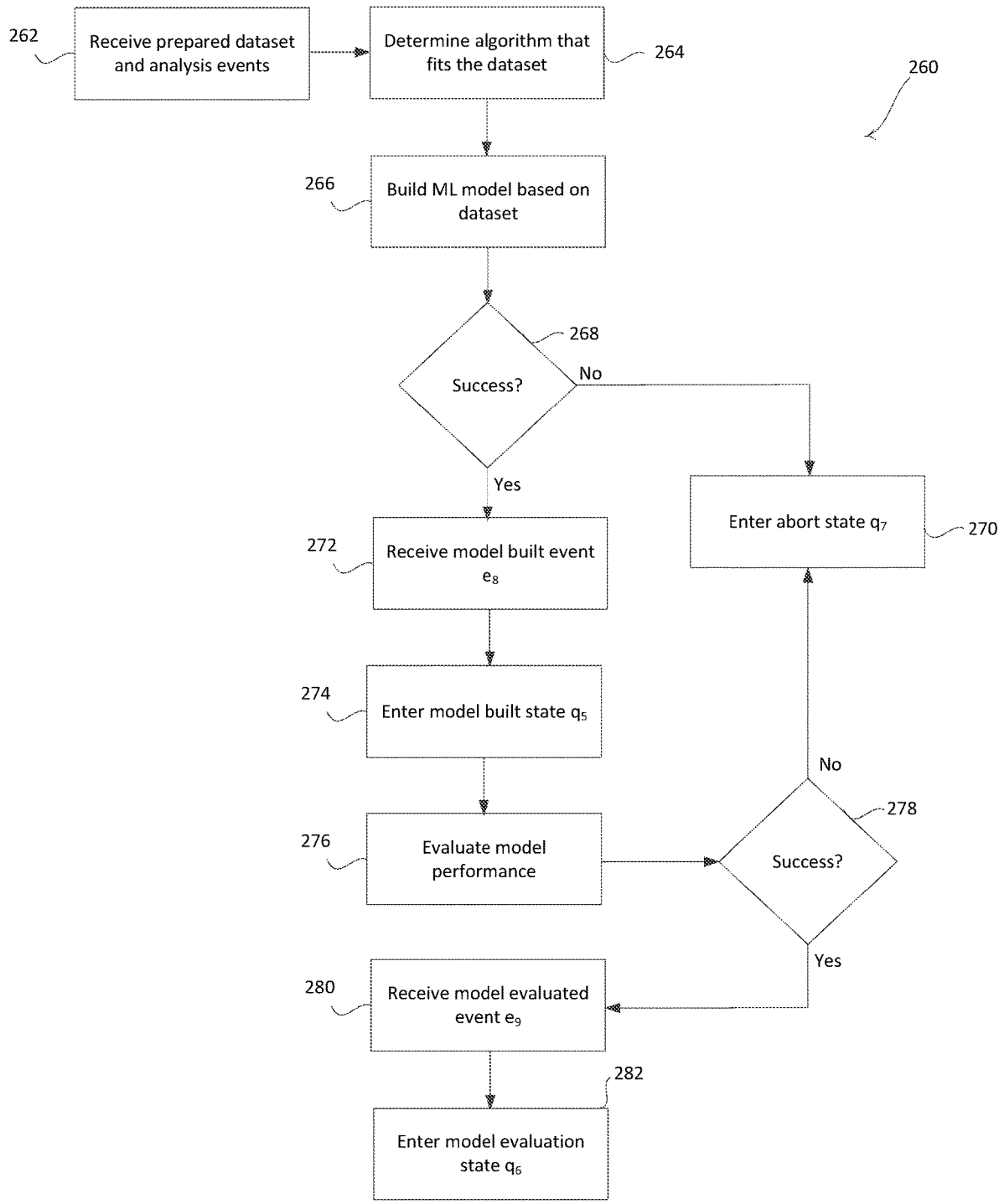
FIG. 2C is an example process that may be performed by an FSA during a machine learning (ML) model phase.

After the dataset has been analyzed, the ML model may pass the dataset and/or one or more analysis events to an ML model phase. For example, the computing device may enter the ML model phase upon the completion of the identified data analysis events and/or a user selection to enter the ML model phase for building the ML model. FIG. 2C is an example process 260 that may be performed by the FSA during the ML model phase. The ML model phase may follow the data analysis phase (e.g., the example process 230 that may be performed by the FSA during the data analysis phase shown in FIG. 2B) and/or the data preparation phase (e.g., the example process 200 that may be performed by the FSA during the data preparation phase shown in FIG. 2A). The ML model phase may include a model built state $q_5$ that may be entered after one or more model events have been triggered.

As shown in FIG. 2C, the prepared dataset may be received with one or more analysis events at 262. The dataset and/or the data analysis events may be received for determining an algorithm that fits the dataset at 264. The dataset and/or the data analysis may be provided to the user via a user interface for informing the user of the appropriate algorithm to select. The user may be presented with a predefined number of algorithms. The algorithms presented may be based on automatically identified information in the dataset and/or the data analysis. The algorithm may also, or alternatively, be automatically selected from a predefined set of algorithms based on identified information in the dataset and/or data analysis. For example, the algorithm may be automatically selected based on a rule set that defines characteristics of the dataset (e.g., attributes and/or data for an attribute) and/or the results of the data analysis. The computing device may look for a predetermined number of conditions to hold true to select each algorithm as a best fit for the dataset. After the algorithm is selected, the algorithm may be inserted into the code for building the ML model.

At 266, the ML model information may be received along with the dataset used and the determined algorithm to build the ML model. A determination may be made, at 268, about whether the ML model build was a success. The ML model build may be a success when the ML model file is a non-null value or a valid ML model file. If the model build was unsuccessful, the FSA may enter the abort state $q_7$ at 270. If the model build was a success, the FSA may send a model built event $e_8$ at 272. The model built event $e_8$ may be triggered once the model is successfully built. The model built event $e_8$ may represent the result of a model build against the dataset. The sender of the model built event $e_8$ may be a model building program built by the user. The model build program may implement a model repository to store the model version and/or pass the model version identifier via this event. The model built event $e_8$ may be the first event in the ML model phase. Other events may be restricted or prevented from being accepted after the model built event $e_8$. Since the resulting model may represent the end result, transformation or analysis may be prevented from being conducted after the model built event $e_8$ is triggered.

At 274, as a result of the ML model being built using the prepared dataset, the FSA may enter the model built state $q_5$. The user may choose to use any framework available to them to build these models (e.g., scikit-learn, ml-lib, etc.). Determination as to which algorithm to use for the dataset may happen outside of the FSA. The model built state $q_5$ may represent the result of a ML model that may be built on a given dataset. Each ML model may be deposited into an ML repository and the link to the ML model may be stored at the computing device when the FSA is in the model built state $q_5$. The ML repository may support versioning of the ML models. For example, the same model may be built multiple times using the same or different datasets and each execution may be tracked as a different model version. The model built state $q_5$ may capture the specific version that was produced by the execution or building of the ML model based on the dataset.

A determination may be made as to whether the model built event $e_8$ is triggered when the FSA is already in the model built state $q_5$. This may allow for accidental duplicate events produced by the senders (e.g. programs developed by users to build the model).

The model performance may be evaluated at 276. After the model is built, users may evaluate that model against the prepared dataset produced at the end of the data preparation phase. The type of model evaluation metric that is used may depend on the algorithm that is used to build the model (e.g., a regression model may use root-mean-square error (RMSE), a binary model may use receiver operating characteristic (ROC) or area under the curve (AUC), etc.).

At 278, a determination may be made as to whether the evaluation was a success. The model performance may be evaluated on a predefined scheduled basis. If the evaluation is unsuccessful, the FSA may enter the abort state $q_7$ at 270. The evaluation may be unsuccessful when a score that indicates the success rate of predictions for the dataset received by the ML model is below a threshold. The failed evaluation may trigger a log event $e_{11}$ may be triggered to generate a log message(s) of the failed evaluation. The FSA may log the failed evaluation and/or the reasons for the failure. An alert may be generated in response to the failed evaluation and displayed to the user to indicate the failed evaluation and/or the reasons for the failure.

If the evaluation is a success, the evaluation of the ML model at 270 may trigger model evaluation event $e_9$ at 280. The model evaluation event $e_9$ may represent a result of the performance evaluation for a given model. The FSA may capture the name of the evaluation metric and/or the result for the given evaluation. This may allow different evaluation metrics for different model algorithms. Other events may be restricted or prevented from being accepted after the model evaluation event $e_9$.

A model evaluation state $q_6$ may be entered at 282. The model evaluation state $q_6$ may represent the performance evaluation for a given model version using the dataset. This may be the final state of the example FSA. Model evaluation may occur repeatedly over time as the dataset changes.

During any of the states of the FSA, a waiting for action event $e_{12}$ may be triggered that may be used to halt the FSA execution. For example, the waiting for action event $e_{12}$ may be triggered when the FSA has completed an action in a given state and is awaiting user action. The FSA may resume execution when another event is triggered. The waiting for action event $e_{12}$ may cause the FSA to enter a waiting for action state $q_8$. The waiting for action state $q_8$ may represent an intermediate state during which an indication from the user may be received to explicitly resume the workflow for the FSA to continue. This state may be entered to get an explicit user consent before proceeding. For example, the waiting for action event $e_{12}$ may be triggered during the transformed state $q_1$, enriched state $q_2$, data prepared state $q_3$, the data analyzed state $q_4$, the ML model built state $q_5$, and/or the model evaluation state $q_6$. To accommodate for accidental duplicate events, the FSA may accept the waiting for action event $e_{12}$ while its already in the waiting for action state $q_8$. After the sending of the waiting for action event $e_{12}$, a log message event $e_{11}$ may be triggered to identify that the FSA is waiting for action and/or how long the FSA is waiting for action. This log may indicate the cause of any delay.

During the waiting for action state $q_8$ of the FSA, other events may be triggered. The workflow that performs data analysis, data preparation, and model building may be implemented to skip certain steps depending on certain input. When resuming the workflow during the waiting for action state $q_8$, the input to the workflow may include an input that will signal the workflow to skip certain steps that are already completed. The FSA may allow the resumed workflow to start from any point. Hence, any events may be allowed to be sent to the FSA when it is in the waiting for action state $q_8$. For example, during the waiting for action state $q_8$, the transformation event $e_1$ may be triggered to cause the FSA to enter the transformed state $q_1$; the enrichment event $e_2$ may be triggered to cause the FSA to enter the enriched state $q_2$; a data test passed event $e_3$ may be triggered to cause the FSA to enter the data prepared state $q_3$; the data visualization event $e_5$, the record statistics event $e_6$, and/or the feature extraction event $e_7$ may be triggered to cause the FSA to enter the data analyzed state $q_4$; the model built event $e_8$ may be triggered to cause the FSA to enter the ML model built state $q_5$; the model evaluation event $e_9$ may be triggered to cause the FSA to enter the model evaluation state $q_6$; and/or the abort event $e_{10}$ may be triggered to cause the FSA to enter the abort state $q_7$.

Figure 3:
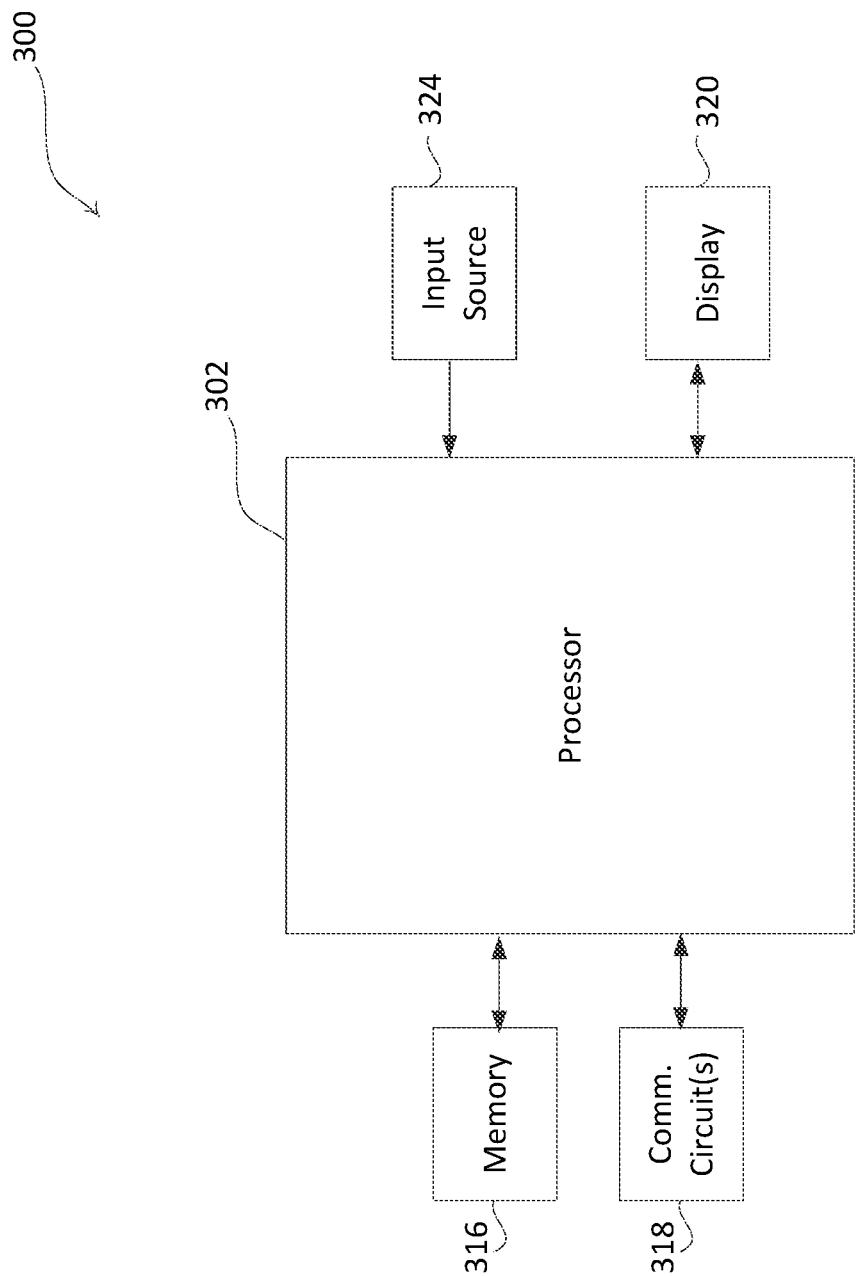
FIG. 3 is a block diagram of an example computing device.

FIG. 3 is a block diagram of an example computing device 300. One or more computing devices may execute the methods and/or portions of the FSA described herein. The computing device may be a server, a desktop, a laptop, or another computing device, for example. As shown in FIG. 3, the computing device 300 may include a processor 302 for controlling the functionality of the computing device 300. The processor 302 may include one or more circuits, such as general-purpose processors, special purpose processors, conventional processors, digital signal processors (DSPs), microprocessors, integrated circuits, a programmable logic device (PLD), application specific integrated circuits (ASICs), and/or the like. The processor 302 may perform signal coding, data processing, image processing, input/output processing, and/or any other functionality that enables the computing device 300 to perform as described herein.

The processor 302 may store information in and/or retrieve information from the memory 316. The memory 316 may include a non-removable memory and/or a removable memory. The non-removable memory may include random-access memory (RAM), read-only memory (ROM), a hard disk, and/or any other type of non-removable memory storage. The removable memory may include a subscriber identity module (SIM) card, a memory stick, a memory card (e.g., a digital camera memory card), and/or any other type of removable memory. The processor 302 may access the memory 316 for executable instructions and/or other information that may be used by the computing device 300.

The computing device 300 may include one or more communication circuits 318. The processor 302 may be in electrical communication with the communication circuit 318 for sending and/or receiving information. The communication circuit 318 may be capable of performing wired and/or wireless communications. For example, the communication circuit 318 may include one or more radio frequency (RF) transceivers for transmitting and receiving RF signals (e.g., BLUETOOTH®, near field communication (NFC), WIFI®, WI-MAX®, cellular, etc.) via an antenna, or other communications module capable of performing wireless communications.

The processor 302 may be in electrical communication with an input source 324 for providing input to the processor 302. The input source 324 may include a mouse, a keyboard, etc. for receiving user input. The keypad may include one or more keys for receiving input from a user. The keypad may include hard or soft keys for which the function of the keys may change as a user performs selections. The mouse may include one or more buttons for receiving user selections.

The processor 302 may be in electrical communication with and/or generate images on a display 320 for providing information (e.g., via user interfaces) to a user. The communication between the display 320 and the processor 302 may be a two-way communication, as the display 320 may include a touch screen module capable of receiving information from a user and providing such information to the processor 302. For example, the display 320 may provide soft buttons for selection by a user that are recognized by the touch screen module and provided to the processor 302 as input.

Figure 4:
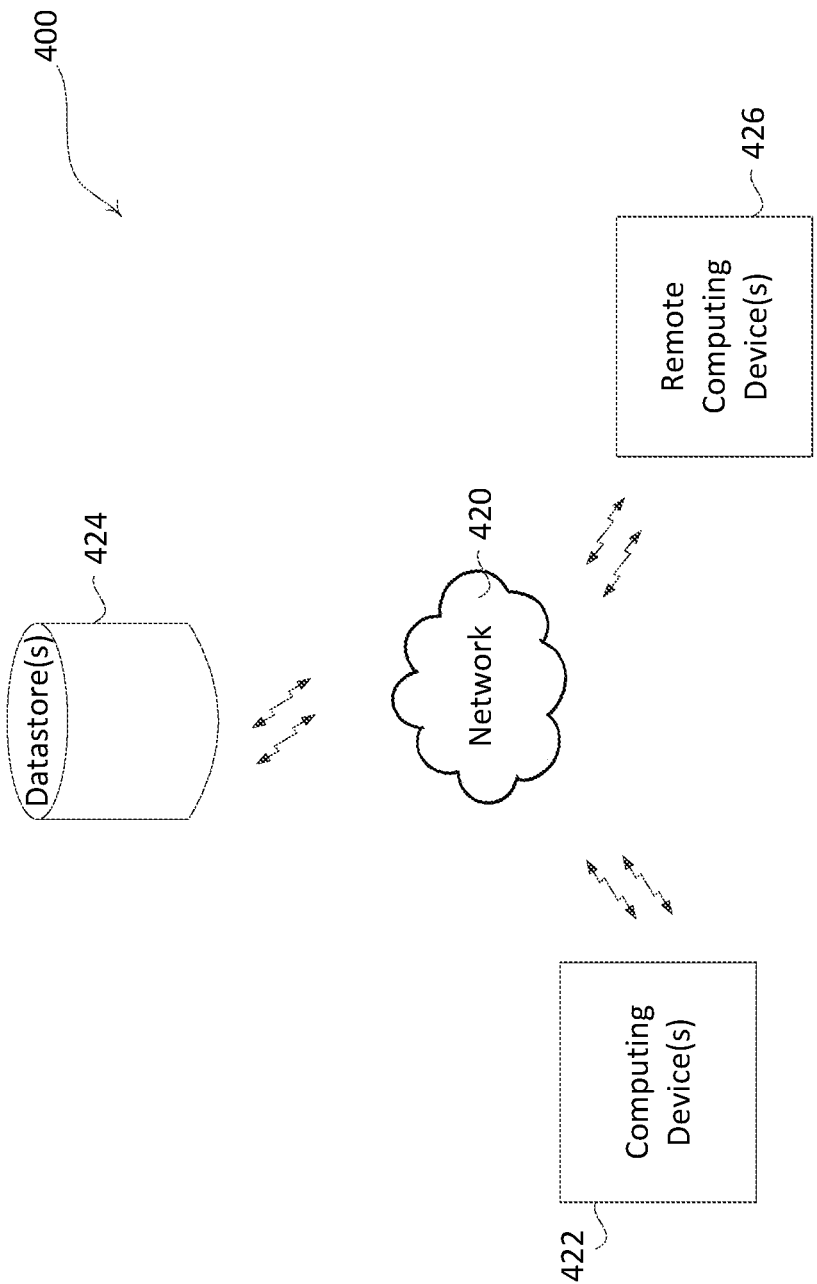
FIG. 4 is a perspective view of a representative computing environment.

FIG. 4 is a perspective view of a representative computing environment 400. As shown in FIG. 4, the computing environment 400 may include one or more computing devices 422, which may be accessed by one or more users. The computing devices 422 may include servers, desktops, laptops, or other computing devices on which the processes described herein may be executed. The computing devices 422 may receive data, process data, and/or store data for implementing the FSA as described herein. The computing devices 422 may receive input from a via a user interface being provided on a display.

The computing devices 422 may communicate with remote computing devices 426 and/or datastores 424 via a network 420 (e.g., using a WI-FI® network, a cellular network, a WI-MAX® network, etc.). The network 420 may be a wired and/or wireless network. The network 420 may be used to communicate over the Internet to other devices.

The computing devices 422 may communicate with the remote computing devices 426 to generate user interfaces for display on the computing devices 422, perform remote computation, and/or obtain external information. For example, the computing devices 422 may provide a user interface via an application or web browser that is generated at a remote computing device 426. The computing devices 422 may access external information from third party sources (e.g., publicly available information, social media information, financial information, health information, etc.) via the remote computing device s 426.

The computing devices 422 may communicate with the datastores 424 to store information and/or retrieve information. The information may include datasets (e.g., including different versions), algorithms, rule sets, ML model criteria, and/or ML models, for example. Stored information may be retrieved from the datastore 424. The datastores 124 may include one or more remote storage locations, which may be collectively referred to as cloud storage. The datastores 424 and/or the computing devices 422 may include in memory a model repository that may keep track of each of the ML models produced. The datastores 424 and/or the computing devices 422 may include in memory a dataset storage that stores each of the datasets that are processed and produced.

The computing devices 422 may include a prediction service that may be implemented that uses the generated ML models to infer the target attribute for a given payload. A user interface may be displayed to visualize the progress, and/or the results of the processes described herein.

Although features, elements, and functions are described above in particular combinations, a feature, element, or function is used alone or in any combination with the other features, elements, or functions. Various presently unforeseen or unanticipated alternatives, modifications, variations, or improvements may be subsequently made that are also intended to be encompassed by the following claims.

The methods described herein are implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random-access memory (RAM), removable disks, and optical media such as CD-ROM disks, and digital versatile disks (DVDs).

What is claimed is:

1. A method comprising:
receiving a plurality of datasets, wherein each dataset of the plurality of dataset comprises a plurality of columns of attributes and a plurality of rows of data for each attribute;
analyzing each dataset according to respective predefined machine learning (ML) model criteria that corresponds to a respective ML model, wherein each respective predefined ML model criteria includes a different predefined input format for at least one of the plurality of columns of attributes or at least one of the plurality of rows of data for the dataset;
automatically transforming each dataset to meet the respective predefined ML model criteria, wherein the transformation of each dataset comprises changing the at least one of the plurality of columns of attributes or the at least one of the plurality of rows of data for the dataset;
automatically enhancing each dataset to meet the respective predefined ML model criteria, wherein the enhancement of each dataset comprises adding at least one column of attributes to the plurality of columns of attributes for the dataset;
performing a plurality of data analysis events on each dataset of the plurality of datasets, wherein the plurality of data analysis events comprise a data visualization event that generates a graph of the data in one or more of the columns of attributes in the dataset, a record statistics event that calculates and stores characteristics of each column attribute comprising numerical values, and a feature extraction event that identifies at least one feature of the attributes in the dataset;
performing a data test on results of at least one of the plurality of data analysis events for each dataset to meet a respective rule set established for the ML model for the dataset, wherein the respective rule set comprises at least one threshold that is tested for a numerical value associated with an attribute of the dataset;
receiving an algorithm for the respective ML model for each dataset of the plurality of datasets; and
building each ML model based on the respective dataset and the respective algorithm to generate an ML model file.

2. The method of claim 1, wherein the characteristics of each column attribute comprising numerical values comprise at least one of a numerical value comprising an average, a minimum, a maximum, a mean, a median, a standard deviation, or a total count value for the attribute.

3. The method of claim 1, wherein the at least one feature comprises a number of attributes in the dataset, a value type for each attribute, whether the attribute includes blank values, whether the attribute requires a valid fill, whether the attribute includes continuous variables, or whether the attribute includes predefined categorical values.

4. The method of claim 1, wherein the data analysis events are triggered automatically after the transformation and the enhancement of the dataset.

5. The method of claim 1, wherein the predefined input format includes at least one of a predefined file type, a predefined number of columns of attributes, at least one one mandatory column of attributes, at least one optional column of attributes, or a predefined format for an entry in a column of the plurality of columns.

6. The method of claim 1, wherein the method is performed by a finite state automata (FSA) that comprises a plurality of states and a plurality of events that are triggered to transition between the plurality of states.

7. The method of claim 1, further comprising:
evaluating the performance of each ML model;
determining that a score associated with at least one of the plurality of ML models is below a threshold; and
displaying an alert to a user that the at least one of the plurality of ML models failed the evaluation.

8. The method of claim 1, further comprising:
storing a log that includes each transformation of at least one dataset that was performed to meet the respective predefined ML model criteria.

9. The method of claim 1, further comprising:
storing a log that includes each enhancement of at least one dataset that was performed to meet the respective predefined ML model criteria.

10. The method of claim 1, further comprising:
storing a log that includes each data analysis event for at least one dataset that was performed.

11. A computing device comprising:
a processor configured to:
receive a plurality of datasets, wherein each dataset of the plurality of dataset comprises a plurality of columns of attributes and a plurality of rows of data for each attribute;
analyze each dataset according to respective predefined machine learning (ML) model criteria that corresponds to a respective ML model, wherein each respective predefined ML model criteria includes a different predefined input format for at least one of the plurality of columns of attributes or at least one of the plurality of rows of data for the dataset;
automatically transform each dataset to meet the respective predefined ML model criteria, wherein the transformation of each dataset comprises changing the at least one of the plurality of columns of attributes or the at least one of the plurality of rows of data for the dataset;
automatically enhance each dataset to meet the respective predefined ML model criteria, wherein the enhancement of each dataset comprises adding at least one column of attributes to the plurality of columns of attributes for the dataset;
perform a plurality of data analysis events on each dataset of the plurality of datasets, wherein the plurality of data analysis events comprise a data visualization event that generates a graph of the data in one or more of the columns of attributes in the dataset, a record statistics event that calculates and stores characteristics of each column attribute comprising numerical values, and a feature extraction event that identifies at least one feature of the attributes in the dataset;
perform a data test on results of at least one of the plurality of data analysis events for each dataset to meet a respective rule set established for the ML model for the dataset, wherein the respective rule set comprises at least one threshold that is tested for a numerical value associated with an attribute of the dataset;
receive an algorithm for the respective ML model for each dataset of the plurality of datasets; and
build each ML model based on the respective dataset and the respective algorithm to generate an ML model file.

12. The computing device of claim 11, wherein the characteristics of each column attribute comprising numerical values comprise at least one of a numerical value comprising an average, a minimum, a maximum, a mean, a median, a standard deviation, or a total count value for the attribute.

13. The computing device of claim 11, wherein the at least one feature comprises a number of attributes in the dataset, a value type for each attribute, whether the attribute includes blank values, whether the attribute requires a valid fill, whether the attribute includes continuous variables, or whether the attribute includes predefined categorical values.

14. The computing device of claim 11, wherein the data analysis events are triggered automatically after the transformation and the enhancement of the dataset.

15. The computing device of claim 11, wherein the predefined input format includes at least one of a predefined file type, a predefined number of columns of attributes, at least one mandatory column of attributes, at least one optional column of attributes, or a predefined format for an entry in a column of the plurality of columns.

16. The computing device of claim 11, wherein each step is performed by a finite state automata (FSA) that comprises a plurality of states and a plurality of events that are triggered to transition between the plurality of states.

17. The computing device of claim 11, wherein the processor is configured to:
evaluate the performance of each ML model;
determine that a score associated with at least one of the plurality of ML models is below a threshold; and
display an alert to a user that the at least one of the plurality of ML models failed the evaluation.

18. The computing device of claim 11, wherein the processor is configured to:
store a log that includes each transformation of at least one dataset that was performed to meet the respective predefined ML model criteria.

19. The computing device of claim 11, wherein the processor is configured to:
store a log that includes each enhancement of at least one dataset that was performed to meet the respective predefined ML model criteria.

20. The computing device of claim 11, further comprising:
store a log that includes each data analysis event for at least one dataset that was performed.

* * * * *